United States Patent
Dahl, Jr.

[15] 3,690,753
[45] Sept. 12, 1972

[54] DATA STORAGE SYSTEM
[72] Inventor: Ernest A. Dahl, Jr., 729 Greenwood Ave., Wilmette, Ill. 60091
[22] Filed: Jan. 2, 1970
[21] Appl. No.: 57

[52] U.S. Cl. .........................353/23, 353/25, 353/74
[51] Int. Cl. .........................G03b 1/48, G03b 23/02
[58] Field of Search.....................353/25–27, 120, 353/22, 23; 40/16, 152, 158

[56] References Cited
UNITED STATES PATENTS

| | | | |
|---|---|---|---|
| 3,373,655 | 3/1968 | Nicholas | 353/120 |
| 3,241,258 | 3/1966 | Field | 40/152 |
| 3,424,524 | 1/1969 | Akiyama | 353/27 |
| 2,954,032 | 9/1966 | Dahl | 40/105.5 |

Primary Examiner—Leonard Forman
Assistant Examiner—A. J. Mirabito
Attorney—Olson, Trexler, Wolters & Bushnell

[57] ABSTRACT

An apertured frame including side and bottom tab sections for holding a microfilm data sheet for filing with others and for use individually in combination with a microfilm reader having a transparent base to support the frame and a transparent upper flat to fit the frame aperture and hold the microfilm data in position for viewing.

4 Claims, 10 Drawing Figures

Patented Sept. 12, 1972
3,690,753
2 Sheets-Sheet 1
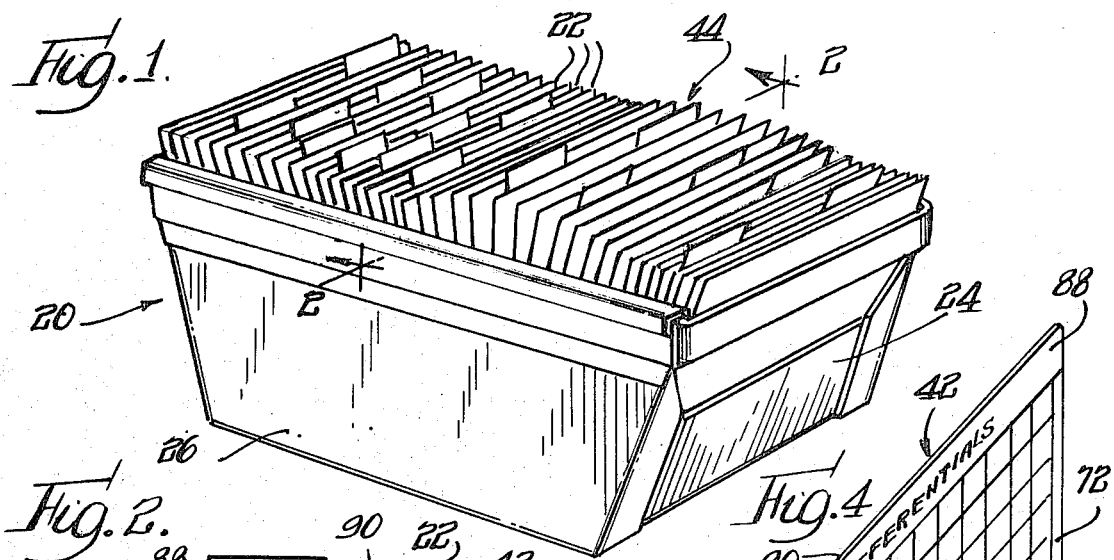
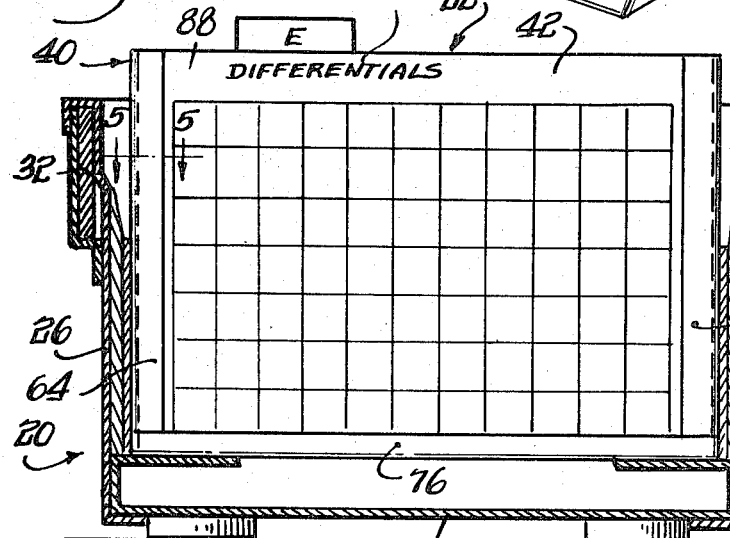
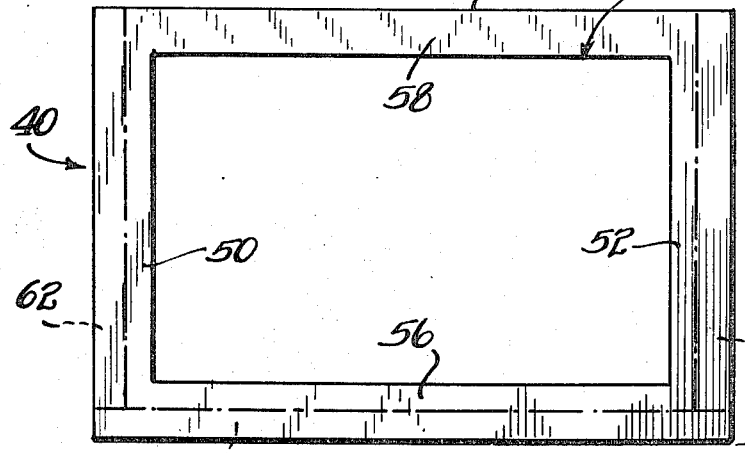
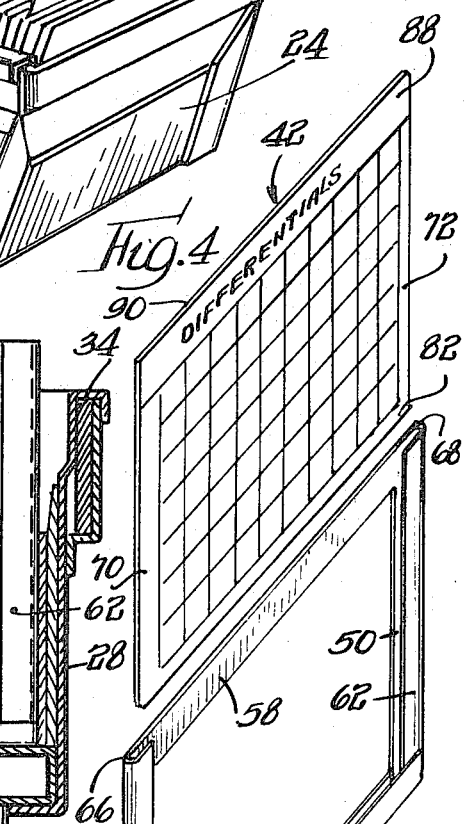
Inventor
Ernest A. Dahl, Jr.
By: Olson, Trexler, Wolters & Bushnell
attys.

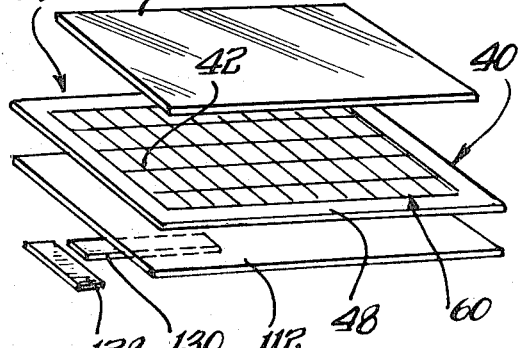
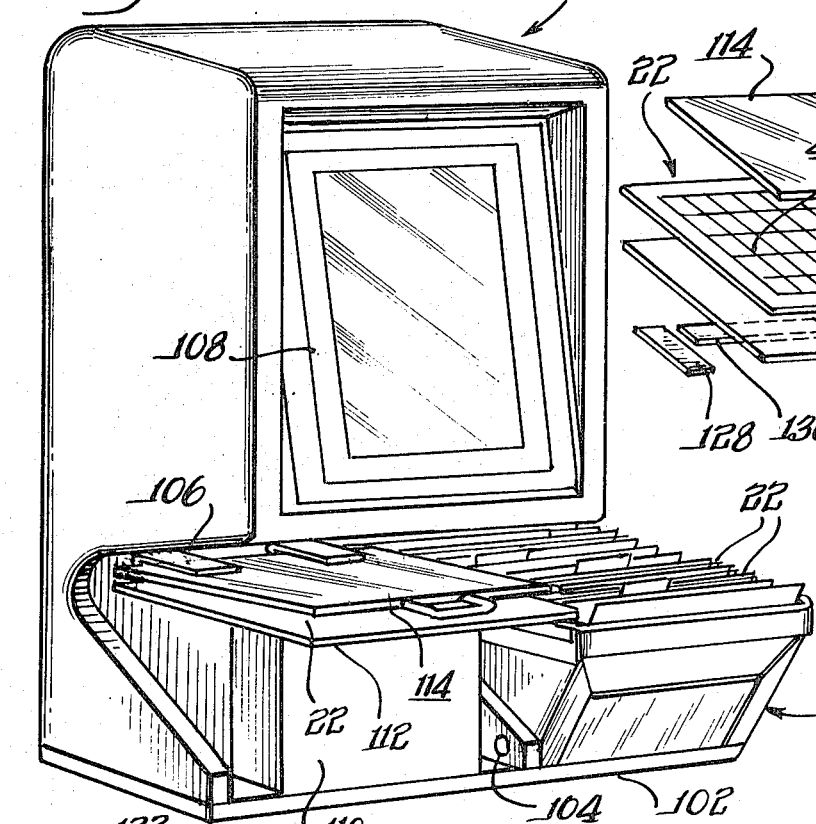
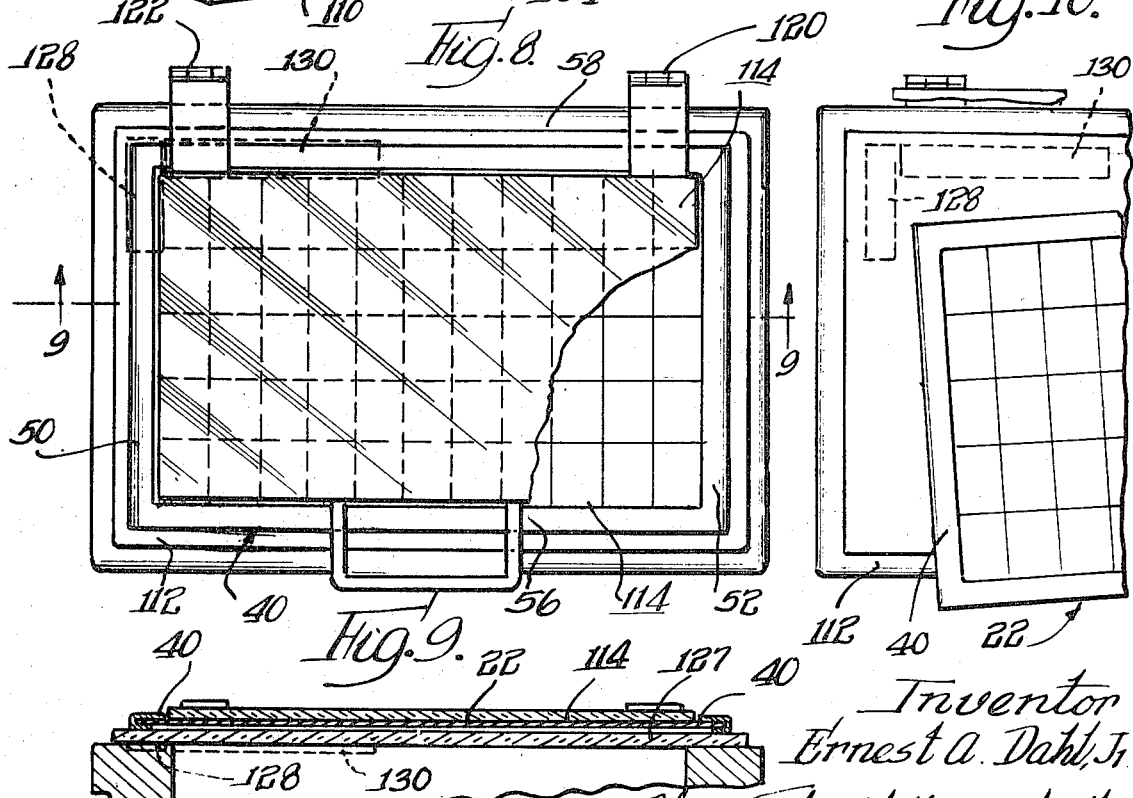

DATA STORAGE SYSTEM

This invention relates generally to a data storage system. Specifically, this invention relates to an assembly including a microfilm data sheet or microfiche supported by a frame. The frame and microfiche are advantageously used with a reader adapted to magnetically position the frame and microfiche for projection of at least a portion of the data on the microfiche.

Microfilm data sheets or microfiche are commonly used to store quantities of data in a relatively small space. The microfiche are usually placed in file containers until they are utilized in a reader. Since the microfiche are made from long rolls of film which are cut into standard size sheets, the microfiche tend to curl back into an arcuate shape after the film has been filed. This "curl memory" results in a bending or other deformation of pasteboard or cardboard separators which have commonly been utilized in prior art filing containers to define filing locations for data bearing objects. The deformed pasteboard dividers or microfiche have been found to be unsatisfactory in use, since the files are hard to search and the "curled" microfiche are difficult to position in a reader for viewing.

Another problem encountered with prior art microfiche data filing systems is a tendency of both the pasteboard separators and the microfiche to be damaged as the file containers are searched. Upper or outer edge portions of both the microfiche and separators are mutilated and defaced by an abrading action of the fingernails of clerks searching the files. The outer end portions of the microfiche and the dividers are also occasionally damaged due to the resting or positioning of a heavy object, such as a file container, on a container of filed microfiche. The pasteboard dividers are also damaged by changes of humidity which tends to warp and wrinkle the dividers.

The microfiche are damaged during use by the stops commonly found in microfilm readers for positioning the microfiche. The stops abrade the edges of the microfiche and gradually mutilate the microfiche. This abrading action is increased when the microfiche are slightly askew when inserted into the reader.

Therefore, it is an object of this invention to provide a microfiche assembly which overcomes the aforementioned disadvantages of the prior art. Specifically, it is an object of this invention to provide a microfiche assembly which retains a filed microfiche in a flat position.

Another object of this invention is to provide a microfiche filing system which protects the microfiche against damage while being searched, while at the same time enabling a desired microfiche to be readily located in the files.

Another object of this invention is to provide a microfiche assembly which is not damaged by stops in a reader.

Another object of this invention is to provide a reader assembly which positions a microfiche for viewing without abrading outer edges of the microfiche.

Another object of this invention is to provide a microfiche assembly which magnetically cooperates with a file container to separate the microfiche by magnetic repulsion and which magnetically cooperates with a reader to position the microfiche for projection of at least a portion of the data on the microfiche.

These and other objects and features of the invention will become more apparent upon a reading of the following detailed description taken in connection with the accompanying drawings wherein:

FIG. 1 is a perspective view of a container assembly in which a plurality of microfiche assemblies are filed;

FIG. 2 is a sectional view, along the line 2—2 of FIG. 1, illustrating the relationship of a filed microfiche assembly to the container;

FIG. 3 is a plan view of a frame used in the microfiche assembly of FIG. 2 for holding a microfiche;

FIG. 4 is a perspective view illustrating the insertion of a microfiche into the frame of FIG. 3;

FIG. 5 is a partial sectional view, along the line 5—5 of FIG. 2, illustrating the relationship of a microfiche to the frame of FIG. 3;

FIG. 6 is a perspective view of the container assembly of FIG. 1 mounted adjacent to a microfilm reader;

FIG. 7 is a perspective, partially exploded, schematic illustration of the positioning of a microfiche assembly, similar to the ones shown in FIGS. 2 and 4, relative to transparent flats or platens of the microfilm reader of FIG. 6;

FIG. 8 is a plan view illustrating the position of a microfiche assembly relative to the flats or platens of the microfilm reader;

FIG. 9 is a sectional view along the line 9—9 of FIG. 8, further illustrating the relationship of the microfiche assembly to the flats or platens of the microfilm reader; and FIG. 10 is a plan view illustrating the inserting of a microfiche assembly on a lower or base flat or platen of the microfilm reader.

Referring now to the drawings in greater detail, a container 20 in which a plurality of microfiche assemblies or slides 22 are positioned is illustrated in FIGS. 1 and 2. The container 20 includes a pair of end walls 24, only one of which is shown, which interconnect a pair of parallel upstanding side walls 26 and 28. A base wall 30 extends between the side walls 26 and 28 to support the microfiche assemblies 22. Permanent magnets 32 and 34 are mounted on an upper end portion of the side walls 26 and 28.

The microfiche assemblies 22 include frame members or support structures 40 in which sheets 42 of data bearing microfilm or microfiche are mounted. The frames 40 are formed of a magnetizable material, such as soft iron, and are magnetized by the permanent magnets 32 and 34 to fan or separate the microfiche assemblies 22, as indicated at 44 in FIG. 1. Similar magnetic fields are induced in the frames 40 by the permanent magnets 32 and 34 to cause the frames to repel each other and to thereby separate the microfiche assemblies 22. The separated microfiche assemblies 22 can be readily searched to locate a desired microfiche and the selected microfiche assembly can be readily removed from the container 20 once it has been located, since it is separated by magnetic repulsion from the adjacent microfiche assemblies. For those who are interested, the structure of the container 20 and the interaction between the metallic frames 40 and the permanent magnets 32 and 34 is explained in greater detail in U.S. Pat. No. 2,954,032 to Ernest A. Dahl, Sr.

The frame 40, as is perhaps best seen in FIG. 3, is integrally formed from a single piece of soft magnetizable metal. The frame includes an aperture defining face or side section 48 including a pair of spaced apart parallel opposite side sections 50 and 52 which are interconnected by a base or lower section or crosspiece 56 and an opposite upper or outer connector or crosspiece section 58. The side, base and outer sections 50 through 58 define a rectangular aperture 60 through which the microfiche 42 can be viewed. Coplanar side legs or tabs 62 and 64 are integrally formed with the side sections 50 and 52 to define a pair of opposite parallel U-shaped grooves or slots 66 and 68, which are best seen in FIG. 4, for enclosing outer side edge portions 70 and 72 of the microfiche 42. In a similar manner a side leg or tab 76 is integrally formed with the base section 56 to form a generally U-shaped base or inner groove 80 which encloses a lower edge portion 82 of the microfiche 42. The grooves 66, 80 and 68 form a continuous U-shaped channel which encloses and protects three edges of the microfiche 42. The coplanar legs or side tabs 62, 64 and 76 are connected to the associated side sections 50, 52 and 56 by arcuate end walls or sections, similar to end wall or section 86 of FIG. 5 which is shown interconnecting the side section 52 with the side tab or leg 64.

The microfiche 42 is mounted within the frame 40 by merely sliding the microfiche downwardly from the position shown in FIG. 4, so that the edge portion 82 of the microfiche is enclosed by the groove 80 while the edge portions 70 and 72 of the microfiche are enclosed by the grooves 66 and 68. The microfiche is held in a generally flat position by the frame 40 which holds the microfiche against "curling" in the manner previously explained. The frame 40 also protects the edges of the microfiche against mutilation by sliding engagement with the sides 26, 28 and 30 of the container 20. If a heavy object, such as a container similar to the container 20, is positioned on top of a container of filed microfiche assemblies 22 the rigid metallic frames 40 protect the microfiche against damage by the heavy object.

As is apparent from an inspection of FIG. 2, the microfiche 42 is positioned in the frame 40 with an upper or outer portion 88 exposed between the sides 62 and 64 of the frame 40. The microfiche 42 has suitable indicia 90 identifying the data recorded on the microfiche 42. The indicia 90 is clearly visible on a front side or surface of the microfiche since the upper portion 88 of the microfiche is not covered by the frame 40. However, the upper portion 88 of the microfiche is supported by the outer section 58 of the frame which is in abutting engagement with a rear surface or side of the microfiche 42. The outer section 58 of the frame, in addition to supporting the microfiche 42 increases the rigidity of the frame without concealing the indicia 90 which identifies the microfiche. In the preferred embodiment of the invention, the entire frame 40 is made of a soft metal to give a positive strong fanning or separating action under the influence of the magnets 32 and 34. However, it will be apparent to those skilled in the art that the frame can be made of a non-magnetizable material with inserts of a magnetizable material mounted in the frame for cooperation with the magnets 32 and 34.

In FIG. 6 the container 20 has been shown in association with a microfilm projector or reader 100. The container 20 is mounted on a common base plate 102 and connected to the reader 100 by a suitable connection means, such as bolts 104. The microfiche assemblies 22 are positioned in a loading or mounting area or holder 106 to enable the image of a portion of the microfiche to be projected onto a viewing or displaying screen or glass 108 by light rays emanating from a light source 110. The microfiche can then be read or scanned in a known manner. The general structure of the microfilm reader itself is well known to those skilled in the art and need not be explained in greater detail at this time. However, it should be noted that the microfilm reader includes an inner or lower transparent base glass flat or platen 112 on which the microfiche assembly 22 is mounted. An upper or outer transparent glass flat or platen 114 is mounted above the base flat 112 to retain the microfiche assembly 22 in a predetermined projecting position on the base flat.

The upper flat or platen 114 has the same size and shape as the aperture 60 in the frame 40. The microfiche assembly 22 is positioned on the lower glass flat or platen 112 with the face side 48 (see FIG. 7) of the frame 40 upward. The upper flat 114 is mounted on hinges 120 and 122 (see FIG. 8) for pivoting movement downwardly through the aperture 60 to press the microfiche 42 firmly against the lower platen 112. Since the tabs or legs 62, 64 and 76 do not project as far inwardly as do the side sections 50 and 52 and the base section 56, a central data display area of the microfiche can be pressed flat against the base or lower platen 112 with a small space or gap between the microfiche and the lower platen 112 adjacent to the inner edges of the tabs or legs 62, 64 and 76 of the frame (see FIG. 9). When the data display area of the microfiche 42 is pressed against the lower flat or platen 112 by the upper flat or platen 114, a clear image of the data is projected onto the screen 108 by light rays which project through the transparent glass flats and a microfiche from the source 110.

The microfiche assembly 22 is positioned on the lower flat or platen 112 by a pair of coplanar magnets 128 and 130 which are mounted beneath the lower flat 112, as shown in FIGS. 7 and 10. The magnets 128 and 130 attract the magnetizable material of the frame 40 of the microfiche assembly 22 to draw or pull the microfiche assembly into a predetermined position for projecting an image of the data on the microfiche onto the screen 108. The magnets 128 and 130 draw the microfiche into its predetermined projecting position even when the microfiche is inserted into the loading area 106 of the reader 100 at a slightly skew angle, as shown in FIG. 10. The magnets pull the microfiche assembly in the direction of the arrows in FIG. 10 to position the microfiche assembly as shown in FIG. 8. Once the microfiche has been positioned relative to the lower or base flat or platen 112 by the magnets 128 and 130, the magnets 128 and 130 attract the microfiche assembly 22 to firmly retain or lock the microfiche assembly in the predetermined projecting position on the lower flat 112.

In view of the foregoing remarks, it is apparent that the microfiche assembly 22 includes a frame 40 of a magnetizable material for supporting and protecting the microfiche 42. The frame 40 cooperates with magnets 32 and 34 which are positioned on opposite sides of the container 20 to fan apart or separate the microfiche assemblies 22 to facilitate searching the container 20 to locate a predetermined microfiche assembly. Once the predetermined microfiche assembly has been located, it is inserted into the loading area 106 of the projector 100. The magnets 128 and 130 which are mounted adjacent to the lower flat 112 of the projector or reader 100 will attract the frame 40 of the microfiche to position the microfiche relative to the lower flat 112. When the microfiche has been positioned by the magnets 128 and 130 an image of the data recorded on the microfiche 42 will be projected onto the display screen 108 by light rays from the light source 110 which will pass through the lower flat 112, the microfiche 42, the upper flat 114 to an optical lens assembly and the display screen 108. The microfiche can then be scanned or read in a known manner.

Although only one container 20 has been shown in association with the reader 100, it will be apparent to those skilled in the art that a plurality of containers can be associated with the reader 100. While a specific platen structure has been illustrated for the reader 100, it is contemplated that platen structures different from the one shown can be used with readers having a different structure from the one shown. Therefore, while particular embodiments of the invention have been shown, it should be understood, of course, that the invention is not limited thereto since many modifications may be made; and it is contemplated to cover by the appended claims any such modifications as fall within the true spirit and scope of the invention.

The invention is hereby claimed as follows:

1. The combination of a centrally apertured and generally rectangular magnetizable frame member holding a microfilm sheet and adapted for storate with others in a file container with side magnet means operable to separate adjacent frame members by magnetic repulsion therebetween to facilitate location and removal of a predetermined frame member and associated microfilm sheet, said frame member comprising a generally flat rectangular face section defining an aperture symmetrical and substantially co-extensive therewith and through which data on the data sheet held by said frame member may be viewed; a first side tab section integrally formed with and extending parallel to said face section to define a first side groove having a generally U-shaped cross-section enclosing a first edge portion of the data sheet; a base tab section integrally formed with and extending parallel to said face section to define a base groove enclosing a second edge portion of the data sheet; and a second side tab section integrally formed with and extending parallel to said face section to define a second side groove having a generally U-shaped cross-section enclosing a third edge portion of the data sheet leaving the top of the face section in its planar condition and unobstructed between said first and second side tab sections permitting insertion and removal of the data sheet relative to the frame member without distortion of the data sheet; said face section, base tab section, and side tab sections forming a frame supporting the data sheet with the microfilm data bearing portion substantially coextensive with said aperture through which the data may be viewed, as in a microfilm reader, and a microfilm reader assembly comprising transparent base means for supporting the frame member and associated microfilm sheet, locating magnet means mounted in said reader assembly adjacent to said base means for positioning the frame member relative to the base means to enable the associated microfilm sheet to be read, and a transparent flat associated with said base means to fit within the symmetrical aperture of said face section to thereby hold the display area of the microfilm sheet in position relative to said base means.

2. The combination as set forth in claim 1, wherein the side and base tab sections terminate short of the respective aperture defining edges of the face section permitting the transparent flat to press the display area of the microfilm sheet against the base means.

3. The combination as set forth in Claim 1 wherein: the locating magnet means forms a corner angle cooperating with a corner of said frame member to orient the same for proper reading of the microfilm sheet.

4. The combination of a frame member for holding a microfilm data sheet and a microfilm reader assembly, in which combination, said frame member comprises a generally flat rectangular face section defining an aperture symmetrical and substantially co-extensive therewith and through which data on the data sheet held by said frame member may be viewed; a first side tab section integrally formed with and extending parallel to said face section to define a first side groove having a generally U-shaped cross-section enclosing a first edge portion of the data sheet; a base tab section integrally formed with and extending parallel to said face section to define a base groove enclosing a second edge portion of the data sheet; and a second side tab section integrally formed with and extending parallel to said face section to define a second, side groove having a generally U-shaped cross-section enclosing a third edge portion of the data sheet leaving the top of the face section in its planar condition and unobstructed between said first and second side sections permitting insertion and removal of the data sheet relative to the frame member without distortion of the data sheet, said face section, base tab section, and side tab sections forming a frame supporting the data sheet with the microfilm data bearing portion substantially coextensive with said aperture through which the data may be viewed, as in a microfilm reader, and between which first and second side tab sections there is unobstructed view of the top of the data sheet carried by the frame member across the top of the face section for clear identification thereof; and said microfilm reader assembly comprises transparent base means for supporting the frame member and associated microfilm sheet, locating magnet means mounted in said reader assembly adjacent to said base means for positioning the frame member relative to the base means to enable the associated microfilm sheet to be read, and a transparent flat associated with said base means to snugly fit within the symmetrical aperture of said face section to thereby press the display area of the microfilm sheet in position between said side tab sections relative to said base means.

* * * * *